(12) United States Patent
Aronovich et al.

(10) Patent No.: US 8,682,873 B2
(45) Date of Patent: *Mar. 25, 2014

(54) EFFICIENT CONSTRUCTION OF SYNTHETIC BACKUPS WITHIN DEDUPLICATION STORAGE SYSTEM

(75) Inventors: Lior Aronovich, Toronto (CA); Michael Hirsch, Mazkeret Batya (IL); Yair Toaff, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/958,205

(22) Filed: Dec. 1, 2010

(65) Prior Publication Data

US 2012/0143835 A1    Jun. 7, 2012

(51) Int. Cl.
*G06F 7/00* (2006.01)
(52) U.S. Cl.
USPC .......................................................... 707/696
(58) Field of Classification Search
None
See application file for complete search history.

(56) References Cited

U.S. PATENT DOCUMENTS

| | | | | |
|---|---|---|---|---|
| 5,204,966 | A | * | 4/1993 | Wittenberg et al. ............... 726/6 |
| 5,649,196 | A | * | 7/1997 | Woodhill et al. ............. 711/148 |
| 6,374,266 | B1 | * | 4/2002 | Shnelvar .............................. 1/1 |
| 6,415,280 | B1 | * | 7/2002 | Farber et al. ................... 707/698 |
| 7,055,008 | B2 | * | 5/2006 | Niles et al. ..................... 711/162 |
| 7,065,619 | B1 | | 6/2006 | Zhu et al. |
| 7,756,833 | B2 | | 7/2010 | Van Ingen et al. |
| 7,814,056 | B2 | | 10/2010 | McGrattan et al. |
| 7,949,662 | B2 | * | 5/2011 | Farber et al. ................... 707/747 |
| 7,962,452 | B2 | * | 6/2011 | Anglin ........................... 707/645 |
| 8,041,679 | B1 | * | 10/2011 | Narayanan .................... 707/645 |
| 8,200,926 | B1 | * | 6/2012 | Stringham ..................... 711/162 |
| 8,244,681 | B2 | * | 8/2012 | Laffin ........................... 707/644 |
| 8,255,365 | B2 | * | 8/2012 | Zeis et al. ...................... 707/640 |
| 8,311,946 | B1 | * | 11/2012 | Warnock et al. ................ 705/52 |
| 8,311,964 | B1 | * | 11/2012 | Efstathopoulos et al. ...... 706/45 |
| 8,346,787 | B1 | * | 1/2013 | Vaikar ........................... 707/756 |
| 8,352,692 | B1 | * | 1/2013 | Jordan .......................... 711/162 |

(Continued)

FOREIGN PATENT DOCUMENTS

JP    2006092553 A    4/2006

OTHER PUBLICATIONS

Kulkarni, P. et al., "Redundancy Elimination Within Large Collections of Files", Proceedings of the Usenix Annual Technical Conference, Jan. 1, 2004, pp. 59-72, Boston, MA.

(Continued)

*Primary Examiner* — Neveen Abel Jalil
*Assistant Examiner* — Kellye Buckingham
(74) *Attorney, Agent, or Firm* — Griffiths & Seaton PLLC

(57) ABSTRACT

A deduplication storage system enables new input data to be deduplicated with data of synthetic backups already constructed, and for this purpose efficiently calculates deduplication digests for synthetic backups being constructed, based on already existing digests of data referenced by the synthetic backups. For each input data segment of the plurality of input data segments of a synthetic backup being constructed, a plurality of deduplication digests of stored data segments, referenced by the input data segment, is retrieved from an index. Each input data segment is partitioned into each of a plurality of fixed-sized data sub-segments. A calculation is performed producing a deduplication digest for a data sub-segment, where the calculation is based on the retrieved deduplication digests of the plurality of stored data sub-segments referenced by the input data sub-segment.

14 Claims, 12 Drawing Sheets

(56) References Cited

U.S. PATENT DOCUMENTS

| | | | |
|---|---|---|---|
| 2006/0059173 A1 | 3/2006 | Hirsch et al. | |
| 2006/0059207 A1* | 3/2006 | Hirsch et al. | 707/201 |
| 2008/0016131 A1 | 1/2008 | Sandorfi et al. | |
| 2009/0182789 A1 | 7/2009 | Sandorfi et al. | |
| 2010/0125553 A1* | 5/2010 | Huang et al. | 707/661 |
| 2010/0169287 A1 | 7/2010 | Klose | |
| 2010/0312752 A1* | 12/2010 | Zeis et al. | 707/640 |

OTHER PUBLICATIONS

Dejun Wang et al., "Efficient multi-resolution compression algorithm for disk-based backup and recovery.", Wuhan University Journal of Natural Sciences, v 11, n 6, p. 1951-1954, Nov. 2006.

Youjip Won et al., "Efficient index lookup for De-duplication backup system", IEEE International Symposium on Modeling, Analysis and Simulation of Computers and Telecommunication Systems, 2008, 3 pages.

Tian-Ming Yang et al., "Scalable high performance de-duplication backup via hash join", Journal of Zhejiang University: Science C (J. Zhejiang Univ. Sci. C) (China) May 1, 2010, 11/5 (315-327).

Symantec, "NetBackup deduplication: additional usage information," ftp://exftpp.symantec.com/pub/support/products/NetBackup_Enterprise_Server/338123.pdf, retrieved on Nov. 8, 2010, 86 pages, see pp. 29, 49.

Jack Fegreus, "Unified Backup and Replication of VMware," http://www.virtual-strategy.com/VSM-Labs/VeeamBackupRecovery.html, Apr. 14, 2010, 6 pages.

* cited by examiner

EFFICIENT CONSTRUCTION OF SYNTHETIC BACKUPS WITHIN DEDUPLICATION STORAGE SYSTEM

BACKGROUND OF THE INVENTION

1. Field of the Invention

The present invention relates in general to computers, and more particularly to apparatus and computer program product embodiments for facilitating synthetic backups within a deduplication storage system in a computing storage environment.

2. Description of the Related Art

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and reduction of network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

SUMMARY OF THE INVENTION

In a backup environment, a full backup contains an entire data set that is backed-up. An incremental backup contains only the portions of the data set (normally in a resolution of files) that were modified since the time of the latest backup, be it a full or an incremental backup. A differential backup contains only the portions of the data set that were modified since the latest full backup. The advantage in incremental and differential backups is that since they contain less data than a full backup, they are more efficient in terms of storage and processing time.

To fully restore a backed-up data set to a specific point in time, normally the full backup preceding that time is restored, and then all the subsequent incremental backups until that point in time are restored in their chronological order. A similar process is done using a differential backup, however in this case after restoring the full backup, only one differential backup should be generally restored. Clearly, such restore operations are time consuming, and more complex than restoring a single backup.

To alleviate the complexity of the restore process described above, the notion of synthetic backups was introduced. A synthetic backup is constructed by a backup application using a process where data from a full backup and its subsequent incremental backups, dating until a specific point in time, is incorporated into a synthetic backup. The created synthetic backup is practically a full backup corresponding to that point in time. Such a backup is termed 'synthetic' because it is created not by a regular backup process, where data is read from sources and stored as a backup, but by a 'synthetic' process, where data of already existing backups is used to construct a synthetic backup. Restoring a synthetic backup is as simple as restoring a full backup, and is performed more quickly than the process of restoring incremental or differential backups as previously described. An additional advantage of synthetic backups is faster creation of a synthetic backup, relative to creating a full backup that is identical in terms of data.

Due to the advantages in efficiency and other characteristics provided by synthetic backups, it is desirable to integrate synthetic backup functionality and related architectures into a deduplication storage system. Accordingly, various embodiments are provided for facilitating construction of a synthetic backup in a deduplication storage system. In one embodiment, by way of example only, a deduplication storage system receives from a backup application a sequence of compact metadata instructions, describing source and target data segments, based on which the deduplication storage system efficiently constructs a synthetic backup, by means of adding references to data of existing backups into a metadata structure created for the synthetic backup being constructed. In a further embodiment, by way of example only, a deduplication storage system enables new input data to be deduplicated with data of synthetic backups already constructed, and for this purpose efficiently calculates deduplication digests for synthetic backups being constructed, based on already existing digests of data referenced by the synthetic backups. For each input data segment of the plurality of input data segments of a synthetic backup being constructed, a plurality of deduplication digests of stored data segments, referenced by the input data segment, is retrieved from an index. Each input data segment is partitioned into each of a plurality of fixed-sized data sub-segments, and each of a plurality of input data sub-segments may reference a plurality of stored data sub-segments. For each of the plurality of input data sub-segments, a calculation is performed producing a deduplication digest for an input data sub-segment, where the calculation is based on the retrieved deduplication digests of the plurality of stored data sub-segments referenced by the input data sub-segments. The plurality of sub-segment deduplication digests are aggregated to generate a deduplication digest of each input data segment. The deduplication digests of each input data segment form a deduplication digest of the synthetic backup.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
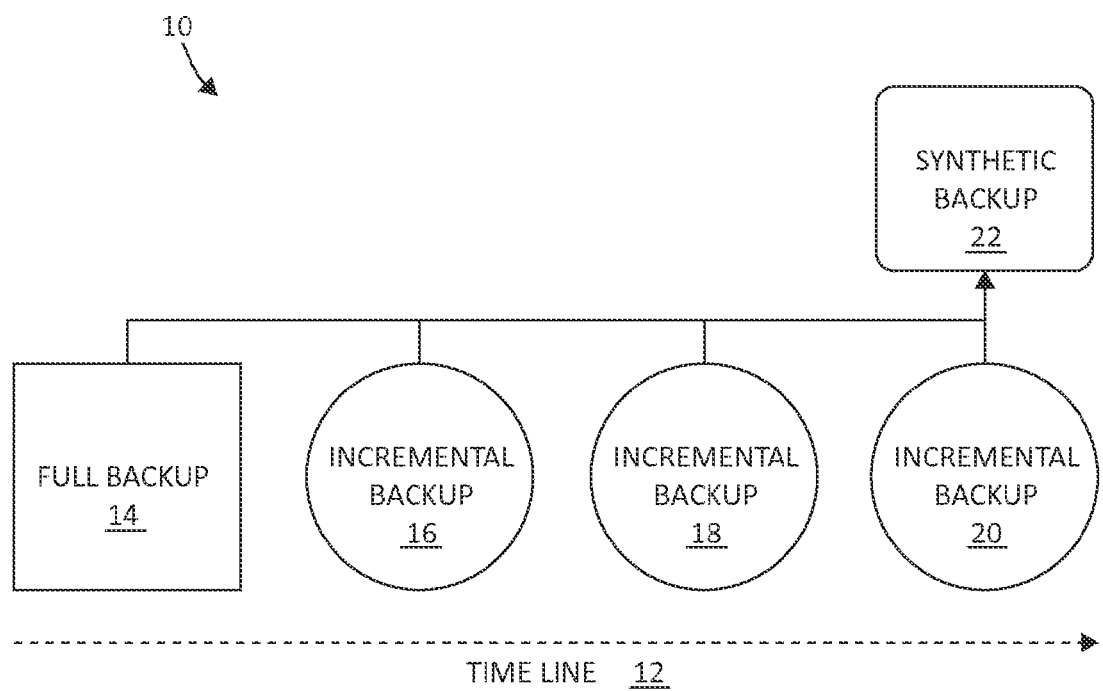
FIG. 1 illustrates an exemplary synthetic backup architecture.

FIG. 1 illustrates an exemplary synthetic backup architecture 10. Architecture 10 is implemented across time line 12 as shown. A full backup 14 is made at an earliest point in time. From this time, incremental backups 16, 18, and 20 are performed at subsequent intervals as shown. Each of the full backup 14, and incremental backups 16, 18, and 20 may be incorporated into a synthetic backup 22 as shown, and as will be described further, following.

Construction of a synthetic backup such as synthetic backup 22 normally consists of copying the data from the existing backups 14, 16, 18, and 20 into the synthetic backup 22. Copying may be done by the backup application reading data segments from the source backups and writing these data segments into the target synthetic backup; or more efficiently by the storage system doing the copying of data using information provided by the backup application which identifies the source and the target data segments.

Figure 2:
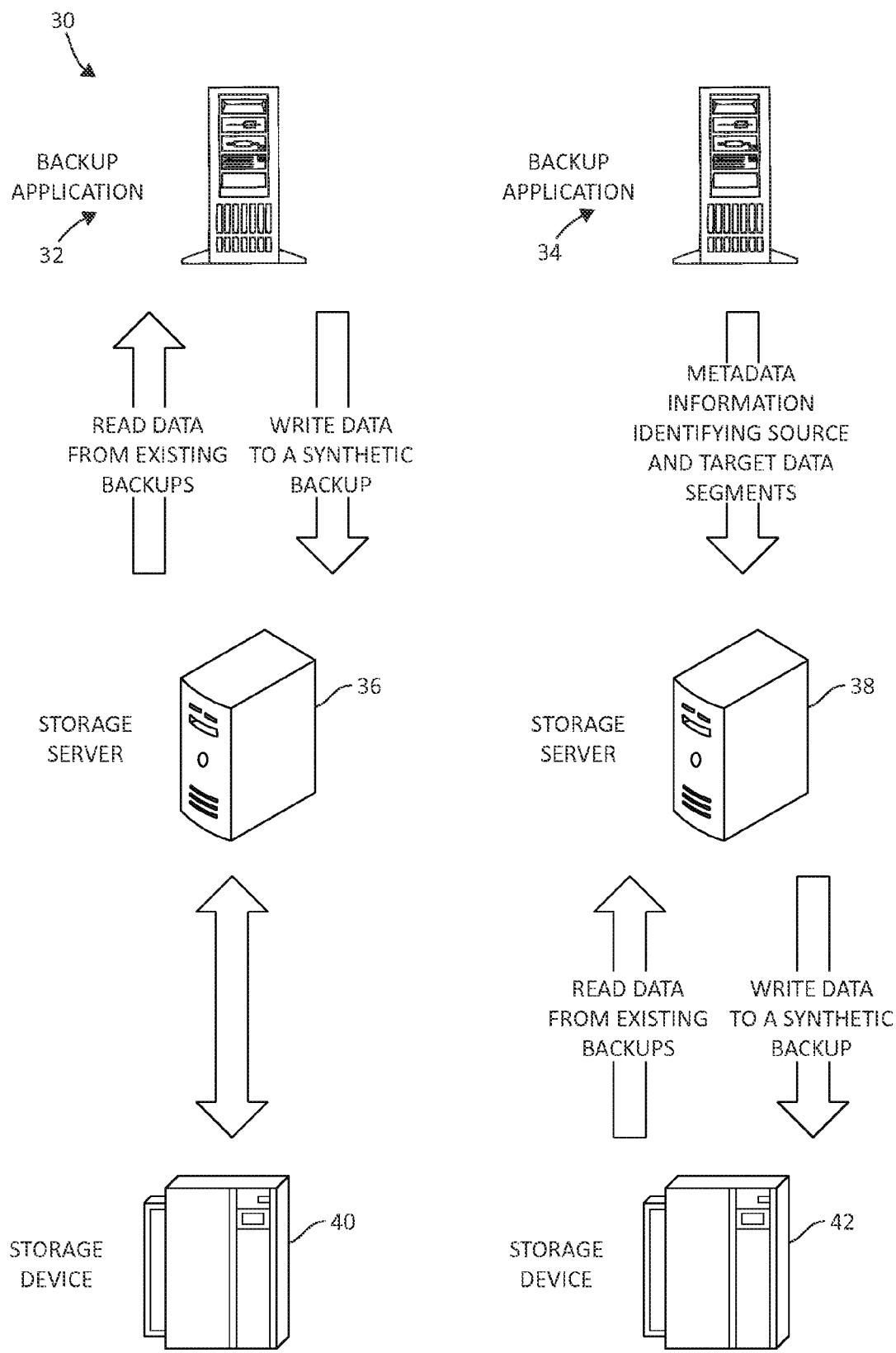
FIG. 2 illustrates an exemplary construction flow of a synthetic backup.

FIG. 2, following, illustrates these two cases in an exemplary construction flow 30 of a synthetic backup. In the first case, and as previously described, a backup application 32 reads data segments from the source backups and writes these data segments into the target synthetic backup by communicating with a storage server 36 which communicates with a storage device 40 as shown. In the second case, and again as previously described, a storage server 38, in communication with a storage device 42, copies the data in construction of a synthetic backup using metadata information identifying source and target data segments obtained from a backup application 34, again as shown.

The mechanisms of the illustrated embodiments provide for efficient construction of synthetic backups within a deduplication storage system. Deduplication storage systems are generally designed to efficiently express segments of new input data in terms of segments of already existing data. The input data is processed to find the matching segments in the storage, which are then referenced in the process of storing the new data (rather than storing the data itself). Only the unmatched data segments are written to the storage as actual data. The references may be to physical data patterns, which are stored as actual data (without references), or to both physical and logical data patterns, where the latter are themselves a set of references to physical and logical patterns.

A first aspect of the illustrated embodiments for efficient construction of synthetic backups is that the backup application, rather than constructing synthetic backups using data copy operations, may issue to the deduplication storage system a sequence of compact metadata instructions, where each instruction specifies a data segment of an existing (source) backup and its designated location in the (target) synthetic backup being constructed. The illustrated embodiments provide for efficient processing of these instructions within the deduplication storage system to construct synthetic backups.

In one of the illustrated embodiments, within a deduplication storage system, each such instruction is efficiently processed, such that the metadata associated with the data segment referenced by the instruction is retrieved, and based on this information references to existing backup data segments are created and added to the metadata of the synthetic backup being constructed. Further, input instructions issued by the backup application may be optimized by the storage system to improve processing efficiency. An example is consolidating instructions referencing adjacent source data segments, to improve the efficiency of storage access within this process. With this method a synthetic backup is constructed in a highly efficient process, using referencing operations, which are internal and fast metadata operations typically inherently supported by deduplication storage systems.

The mechanisms of the illustrated embodiments also enable new input data to be deduplicated with data of synthetic backups. This may be achieved by computing a digest of the synthetic backup's data, which serves for search of similar data segments in the storage during the deduplication process, and inserting this digest into a deduplication facilitating index, termed herein as the digests index. When new input data is processed, a digest of the input data is computed and searched for in the digests index. If matching digests are found in the index (each pointing to a similar data segment in the storage), then an additional process is used to refine and identify the exact matching data segments in the storage. In this way, data of synthetic backups can be later matched with new input data within a deduplication process.

Further, in the mechanisms of the illustrated embodiments, the digests of the data of a synthetic backup are efficiently calculated based on the already existing and stored digests of the data segments referenced by the synthetic backup, rather than being computed anew based on the synthetic backup's data itself. This enables to reduce access to the synthetic backup's data during construction of the synthetic backup, and further enables to reduce digest computation based on the data itself. The mechanisms of the illustrated embodiments significantly accelerate the calculation of deduplication digests for a synthetic backup, thus significantly improving the overall construction time of a synthetic backup. A method for calculating and using digests of data for deduplication, capable of implementation in one exemplary embodiment of a deduplication storage system in which aspects of the illustrated embodiments may be realized, is specified in U.S. Pat. No. 7,523,098, and entitled "Systems and Methods for Efficient Data Searching, Storage and Reduction", the relevant portions therein incorporated by reference.

One aspect of the illustrated embodiments is summarized as follows. For an input data segment of a synthetic backup, fine-grained deduplication digests of stored data segments, which are referenced by the input data segment, are retrieved from an index. The input data segment is partitioned into fixed sized sub-segments, and each of these sub-segments may reference multiple stored sub-segments (depending on alignment). For each input sub-segment, a calculation is performed producing a deduplication digest for the input sub-segment, where the calculation is based on the retrieved deduplication digests of the stored sub-segments referenced by the input sub-segment. In certain cases, where this calculation can not be completed, a deduplication digest is calculated based on the data of the input sub-segment. However the frequency of these cases is typically low relative to the case where the calculation can be completed. The calculated digests of the input sub-segments are then aggregated to produce a deduplication digest of the input data segment. The deduplication digests of all the data segments of a synthetic backup form the deduplication digest of the entire synthetic backup.

Inherent in deduplication storage systems is the ability of expressing segments of new input data in terms of segments of already existing data. The input data is processed to find the matching segments in the storage, which are then referenced in the process of storing the new data (rather than storing the data itself). Only the unmatched data segments are written to the storage as actual data.

There are several ways to implement the referencing functionality. Generally, referencing may be implemented based on physical data patterns or on logical data patterns. In the first alternative a new data pattern references data patterns that are stored as actual data (without references), and can be referenced using some type of storage identifier. Such data patterns are termed as physical data patterns. In the second alternative a new data pattern may reference both physical data patterns as well as logical data patterns, where the logical data patterns are themselves a set of such references to physical and logical patterns.

Figure 3:
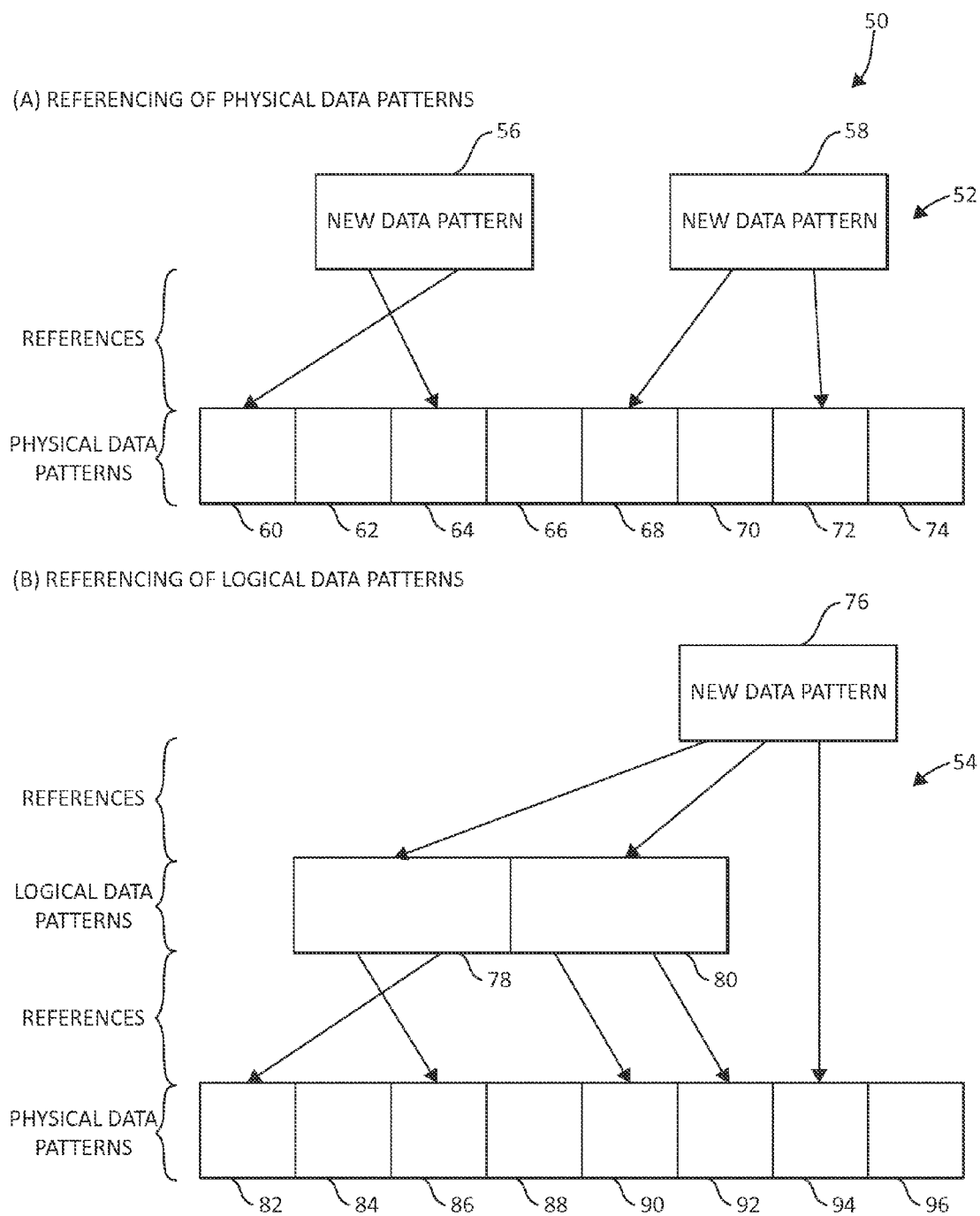
FIG. 3 illustrates exemplary reference approaches in data patterns.

The two referencing approaches 52, 54 are illustrated collectively as referencing patterns 50 in FIG. 3, following. In case (A) as illustrated for referencing of physical data patterns, new data patterns 56, 58 reference data patters that are stored as physical data patterns 60-74 (i.e. actual data) as shown. In case (B) as illustrated for referencing of logical data patterns, new data pattern 76 references both logical data patterns 78, 80, as well as physical data patterns 82-96 as shown.

In one of the illustrated embodiments, the deduplicated data is stored as physical data patterns in storage blocks, where each storage block has an associated reference count property. To store a new data segment, the new segment is matched with existing data segments (using an independent method for finding matching data, which may be implemented using various approaches), the metadata of the matching data segments is retrieved, and then references are created for the new data pattern pointing to the storage blocks (containing physical data patterns) which are referenced by the matching data segments. These references are encapsulated into records within the metadata file created for the new data pattern. Storage blocks may be referenced wholly or partly, and this information is indicated in the metadata records. To store a new data segment that is not matched with any existing data segment, its data is stored in storage blocks, and references are created to these blocks and added to its metadata file. When a storage block is referenced, the value of its reference count property is incremented in accordance with the number of new references made to that block. When a storage block is de-referenced, namely by deleting a data segment referencing that block, the value of its reference count property is decremented in accordance with the number of references removed. As long as the value of the reference count property of a storage block is larger than zero, the block must be maintained in the storage. When this value becomes zero, the block can be removed from the storage.

Figure 4:
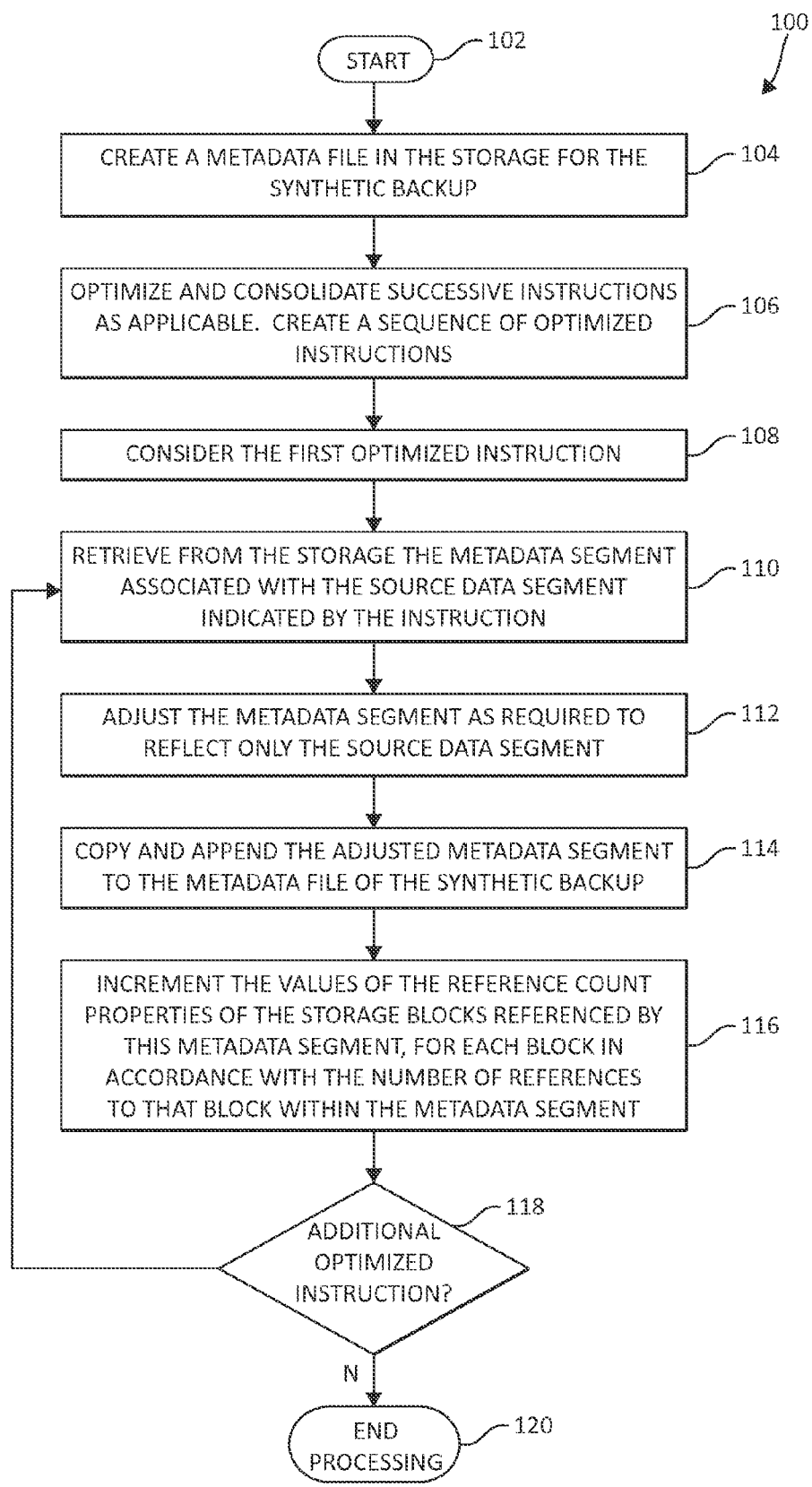
FIG. 4 illustrates an exemplary method for constructing a synthetic backup for use in a deduplication storage system.

Turning now to FIG. 4, an exemplary method 100 for constructing a synthetic backup for use in a deduplication storage system is depicted. In one embodiment, method 100 may be implemented using deduplication system components, or various other processing, networking, and storage components in computing environments. As one skilled in the art will appreciate, various steps in the method 100 may be implemented in differing ways to suit a particular application. In addition, the described method may be implemented by various means, such as hardware, software, firmware, or a combination thereof operational on or otherwise associated with the computing environment. For example, the method 100, as well as the following illustrated exemplary methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Method 100 begins (step 102) with the creation of a metadata file in the storage for the synthetic backup being constructed (step 104). Successive instructions pertaining to the synthetic backup are optimized and consolidated as applicable, to improve processing efficiency. Specifically, instructions referencing adjacent source data segments are consolidated, to improve the efficiency of access to metadata. A sequence of optimized instructions is created (step 106). A first optimized instruction is considered (step 108). For each optimized instruction, the metadata segment associated with the source data segment indicated by the instruction is retrieved from the storage. This metadata information generally contains references to storage blocks (containing the data patterns constituting the source data segment) (step 110).

This metadata segment is adjusted as required to reflect only the source data segment (step 112). Specifically, for example, references to storage blocks at the edges of the source data segment may be adjusted to indicate shorter portions of the referenced blocks. The adjusted metadata segment is copied (appended) to the metadata file of the synthetic backup (step 114). The values of the reference count properties of the storage blocks referenced by this metadata segment are incremented, for each block in accordance with the number of references to that block within the metadata segment (step 116). If an additional optimized instruction exists (step 118), the method 100 returns to step 110 for additional processing. Otherwise, the method 100 then ends (step 120). By using the foregoing exemplary method, a synthetic backup is constructed in a highly efficient process, using referencing operations, which are internal and fast metadata operations typically inherently supported by deduplication storage systems.

In one aspect of the illustrated embodiments, a synthetic backup once created is independent of its originating backups, and may be considered as such by the backup application. Namely, if some or all of the backups, whose data was referenced to construct the synthetic backup, are deleted, then the synthetic backup remains intact. This is due to the fact that in one aspect of the illustrated embodiments a synthetic backup is stored in the deduplication storage system essentially in the same way by which regular backups are stored. Specifically, similar metadata structures are created for synthetic and regular backups, and storage blocks are referenced in the same way for synthetic and regular backups. An inherent benefit in the above property is that synthetic backups can be referenced by a backup application when constructing new synthetic backups.

Further, it is beneficial to enable new input data to be deduplicated with data contained in synthetic backups, especially if some or all of the backups from which the synthetic backup was constructed are already deleted from the storage (note that as long as the synthetic backup remains available, its referenced storage blocks remain available). To enable such deduplication, the data contained in synthetic backups should be made available for matching with the data of new backups. Implementation of this availability depends on the specific method used to realize the matching process of new and existing data within a data deduplication process.

In an exemplary deduplication storage system in which aspects of the illustrated embodiments are incorporated, making stored data available for deduplication with new input data is implemented by computing a digest of the data, which serves for search of similar data segments in the storage during the deduplication process, and inserting this digest into a deduplication facilitating index, termed herein as the digests index. Then, when new input data is processed, a digest of the input data is computed and searched for in the digests index. This index enables to search for matching digests of stored data given digests of new data. If matching digests are found in the index (each pointing to a similar data segment in the storage), then an additional process is used to refine and identify the exact matching data segments in the storage. Subsequently, the digests of the input data are inserted into the digests index (thus enabling newer data to be matched with the current input data), possibly displacing from the index part or all of the digests of the stored data that was matched with the input data.

Figure 5:
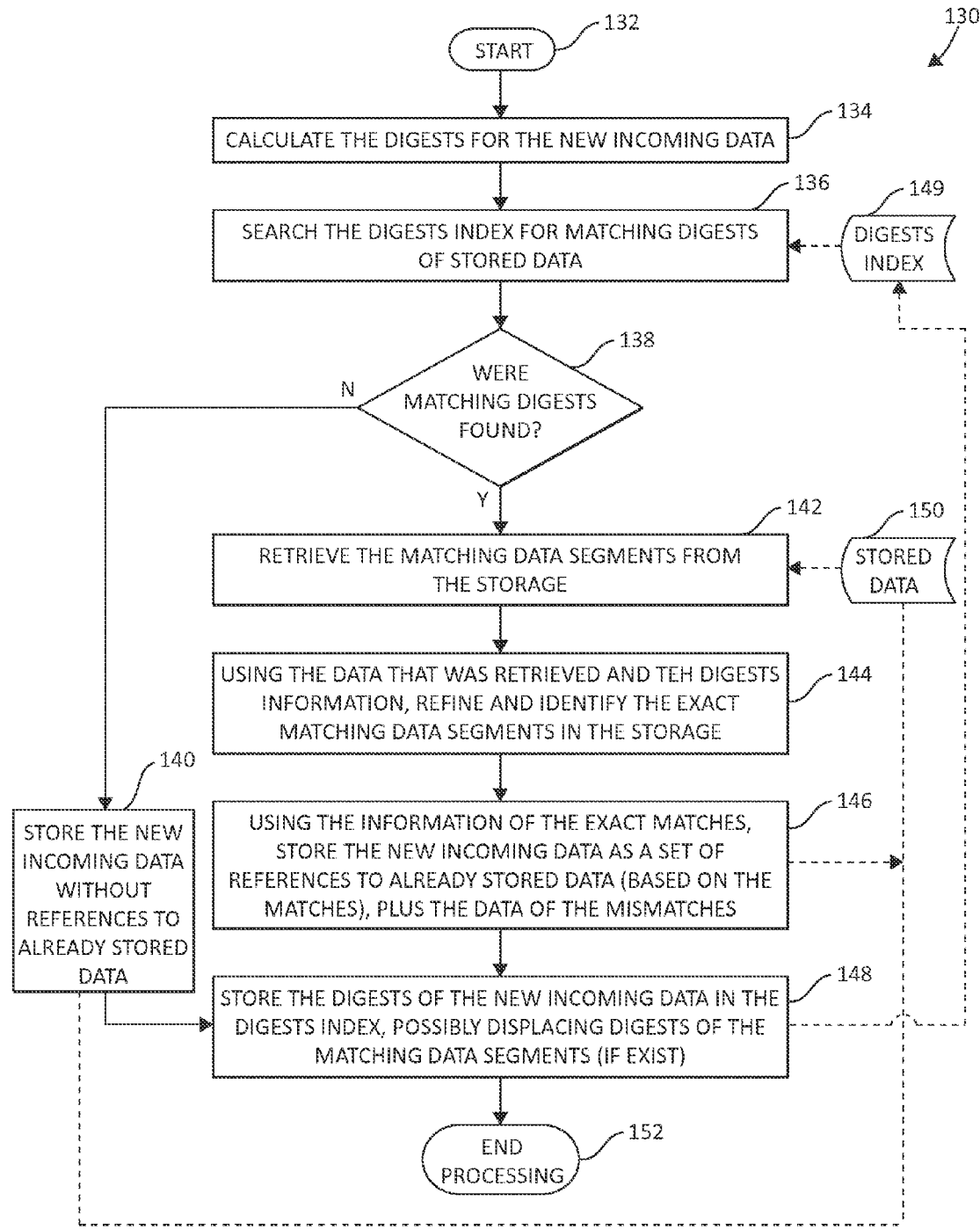
FIG. 5 illustrates an exemplary deduplication process.

FIG. 5, following, illustrates an exemplary deduplication process 130 with the foregoing discussion in mind. Method 130 begins (step 132), by calculating the respective digests for the new incoming data (step 134). The digests indexes (149) are searched for matching digests of stored data (step 136). If a match is found (step 138), then the matching data segments are retrieved from the stored data 150 in the storage (step 142). Using the data that was retrieved and the digests information, the exact matching data segments in the storage are refined and identified (step 144). Using the information of the exact matches, the new incoming data is stored as a set of references to already stored data (based on the matches), plus the data of the mismatches (step 146). The digests of the new incoming data are stored in the digests index, possibly displacing the digests of the matching data segments, if they exist (step 148). Returning to step 138, if no matches are found, the new incoming data is stored without references to already stored data (step 140). The method 130 then ends (step 152).

By computing a digest of the data of a synthetic backup and inserting it into the digests index, the data of a synthetic backup can be later matched with new input data within a deduplication process. A possible method for computing the digests of the data of a synthetic backup is to retrieve this data from the storage during construction of the synthetic backup, and compute the digests based on the data. However, since, in one aspect of the illustrated embodiments, a synthetic backup is constructed using only metadata operations without any access to the data itself (namely, the backup application provides metadata instructions to the storage system, which then performs only metadata operations to construct a synthetic backup), and since access to and operations on data are significantly slower than access to and operations on metadata (as the size of the data is typically much larger than the size of its associated metadata), thus accessing and retrieving data within the construction process of a synthetic backup may significantly slow this process and potentially reduce its efficiency.

To address this issue, one aspect of the illustrated embodiments provides a methodology for efficiently computing the digests of the synthetic backup's data, which minimizes access to the data itself. In this regard, the digests of the synthetic backup's data are efficiently computed based on the already existing and stored digests of the data segments referenced by the synthetic backup (rather than being computed anew based on the data itself). This methodology is generally applicable for digests that are calculated as aggregates of finer grain digests.

Figure 7:
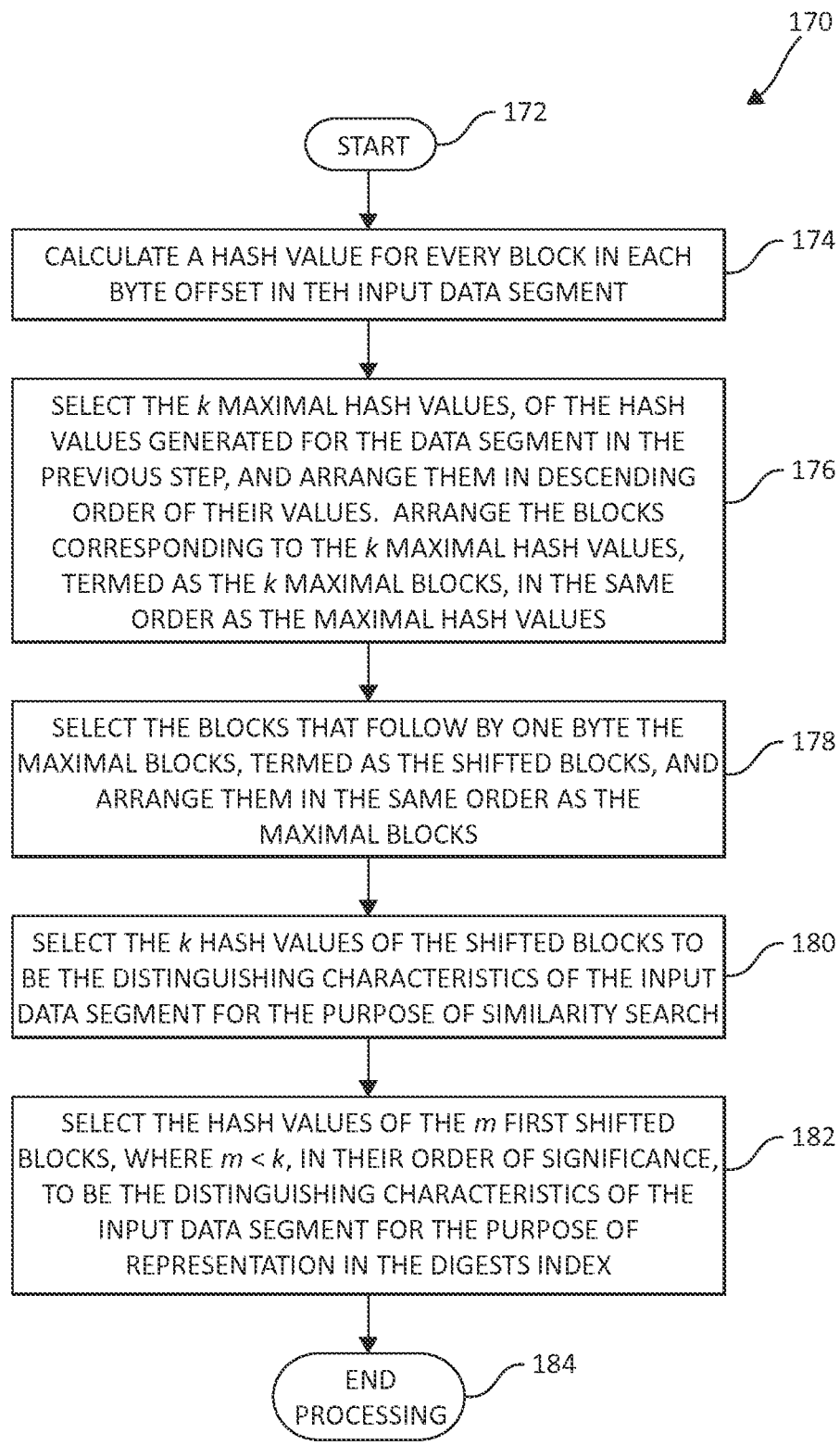
FIG. 7 illustrates exemplary calculation of k and m distinguishing characteristics for an input data segment.

In the following, an exemplary computation of deduplication digests of data is provided. As a first step, the input data is partitioned into segments, where each segment is processed for deduplication. In one embodiment, the size of each such data segment is 16 MB. For each such segment, k and m distinguishing characteristics, constituting the deduplication digests of that segment for search and representation respectively, are calculated using the following exemplary method 170 illustrated in FIG. 7. The value of k is typically low (e.g. a few tens), and the value of m may be lower than ten.

Method 170 begins (step 172) by calculating a hash value for every block in the input data segment, where the size of these blocks is substantially smaller than the size of the input data segment (e.g. 4 KB), and where the blocks overlap, namely, given a block starting in location l in the input data segment (the location is specified in terms of bytes), the location of the next block starts in location l+1 (step 174). In one embodiment, these hash values are calculated using a rolling hash function. With such a hash function, the hash values are efficiently calculated based on successive blocks of data, such that each block starts one byte after the starting byte of the previous block. A rolling hash function has the benefit that once the hash value for a block of data is known, calculating the hash value for the next block (starting one byte after the starting byte of the previous block) can be done in O(1) operations.

Figure 6:
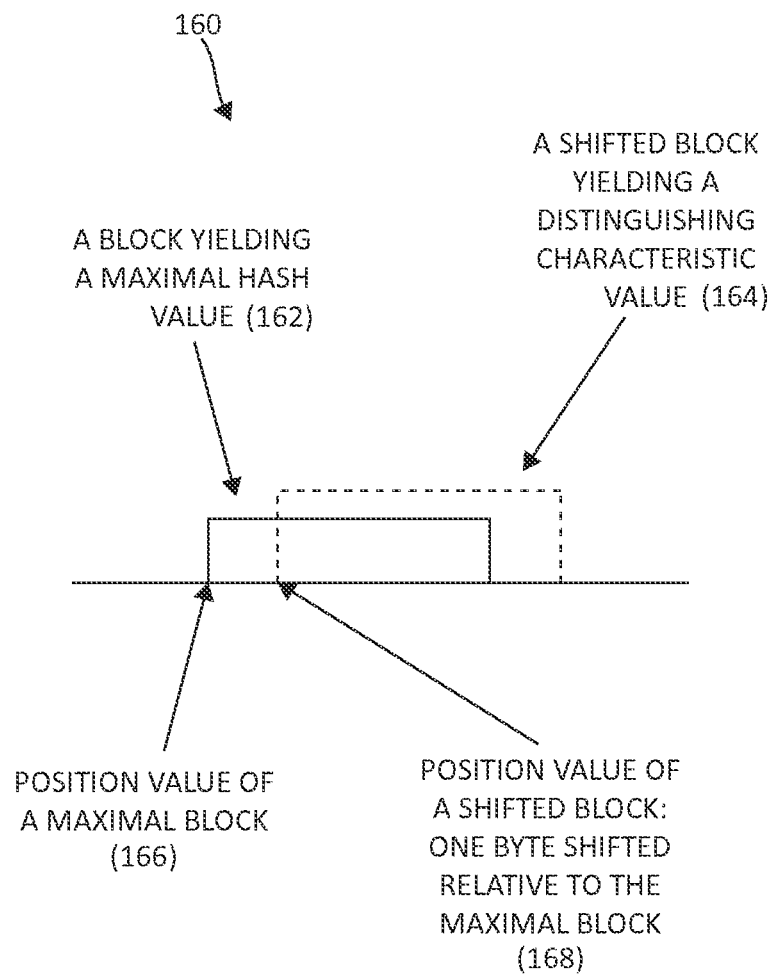
FIG. 6 illustrates an exemplary maximal and shifted block of data.

The k maximal hash values, of the hash values generated for the data segment in the previous step, are selected and arranged in descending order of their values, where this order is termed as the order of significance. The blocks corresponding to the k maximal hash values, termed as the k maximal blocks, are logically arranged in the same order as the maximal hash values (for the purpose of the next step in the calculation) (step 176). The blocks that follow by one byte the maximal blocks (associated with the k maximal hash values), are selected, and are logically arranged in the same order as the maximal blocks. These blocks are termed as the shifted blocks. FIG. 6, previously, illustrates a scenario 160 depicting a maximal block 162, its respective position 166, its respective shifted block 164, and its respective shifted position 168.

Turning again to FIG. 7, as a next step, the k hash values of the shifted blocks are selected to be the distinguishing characteristics of the input data segment for the purpose of similarity search (step 180). These distinguishing characteristics are subsequently used to search the digests index for similar data segments in the storage. During similarity search of a new input data segment, up to k distinguishing characteristics are possibly searched for in the digests index. Finally, the hash values of the m first shifted blocks, where m<k, in their order of significance, are selected to be the distinguishing characteristics of the input data segment for the purpose of representation in the digests index (step 182). These distinguishing characteristics are subsequently stored in the digests index to represent the input data segment and enable subsequent new input data segments to find that input data segment during similarity search. Method 170 then ends (step 184).

Note that the maximum values have a numeric distribution that is not uniform. However, using a good hash function, the numeric distribution of the distinguishing characteristics selected in this step is very close to uniform, and therefore the distinguishing characteristics selected in this way are more effective in uniquely identifying segments of data. Also note that any repeatable selection criterion of hash values is applicable for step 176 in FIG. 7. For example, selecting the k minimal hash values, or the k hash values closest to the median of all the hash values calculated for the data segment, or the k hash values closest to some predetermined constant. In addition, instead of using a one byte shift of the block corresponding to a maximal hash value, some other predetermined and repeatable shift can be used, or possibly different shifts depending on the position and/or on the calculated hash value. Using the maximal hash values and one byte shifts is an exemplary embodiment.

The above exemplary method 170 produces distinguishing characteristics which are, to a high extent, unique, robust, well spread, and repeatable, for a given data segment. Unique means that two different data segments will be assigned, with sufficiently high probability, with two different sets of characteristics. Robust means that the characteristics assigned to a data segment will remain fairly constant given that the data segment undergoes limited changes (e.g. in up to 25% of its contents). Well spread means that the characteristic locations are generally uniformly spread over the data segment. Repeatable means that a specific form of a data segment will always produce the same values of distinguishing characteristics.

The reason for using k distinguishing characteristics for similarity search and m distinguishing characteristics for representation in the digests index, is that there are two possible effects on the maximal hash values that may be caused by modifications of a new data segment with respect to its similar stored data segments. The first effect is that a maximal hash value can disappear because the data that comprises its corresponding block has been modified. The second effect is that modified data can introduce a higher maximal hash value, thus displacing a previous maximal hash value. To solve the second effect, similarity search is done using k distinguishing characteristics, while a data segment is represented using m distinguishing characteristics.

In one embodiment, an input data segment is partitioned into a plurality of fixed sized sub-segments. A possible value of the fixed size of the said segments may be a few tens or a few hundreds of kilobytes, for example 512 KB. It is assumed that the value of k is smaller than the fixed size of the sub-segments. While the k distinguishing characteristics for similarity search are calculated for the entire data segment, m distinguishing characteristics are calculated for each of the sub-segments, as well as for the entire data segment, for storage in the digests index.

Further, in one embodiment, the digests index provides two functions (possibly with two internal index structures). In the first function, termed as distinguishing characteristics index or DC index, the index stores the m distinguishing characteristics of entire data segments, and given values of distinguishing characteristics to search for, enables to find matching distinguishing characteristics of stored data segments. Each index record of a matched distinguishing characteristic also includes a pointer to the storage location of its respective data segment and the specific location of the distinguishing characteristic within its respective data segment. In the second function, termed as storage identifiers index or SI index, the index stores the m distinguishing characteristics of data sub-segments, and given storage identifiers of sub-segments (where storage identifiers essentially identify the location of their respective data sub-segments in the storage), enables to find the distinguishing characteristics of the specified sub-segments. Each index record of a retrieved distinguishing characteristic includes its value, the maximal hash value that is associated with that distinguishing characteristic, and the storage location of that distinguishing characteristic.

Figure 8:
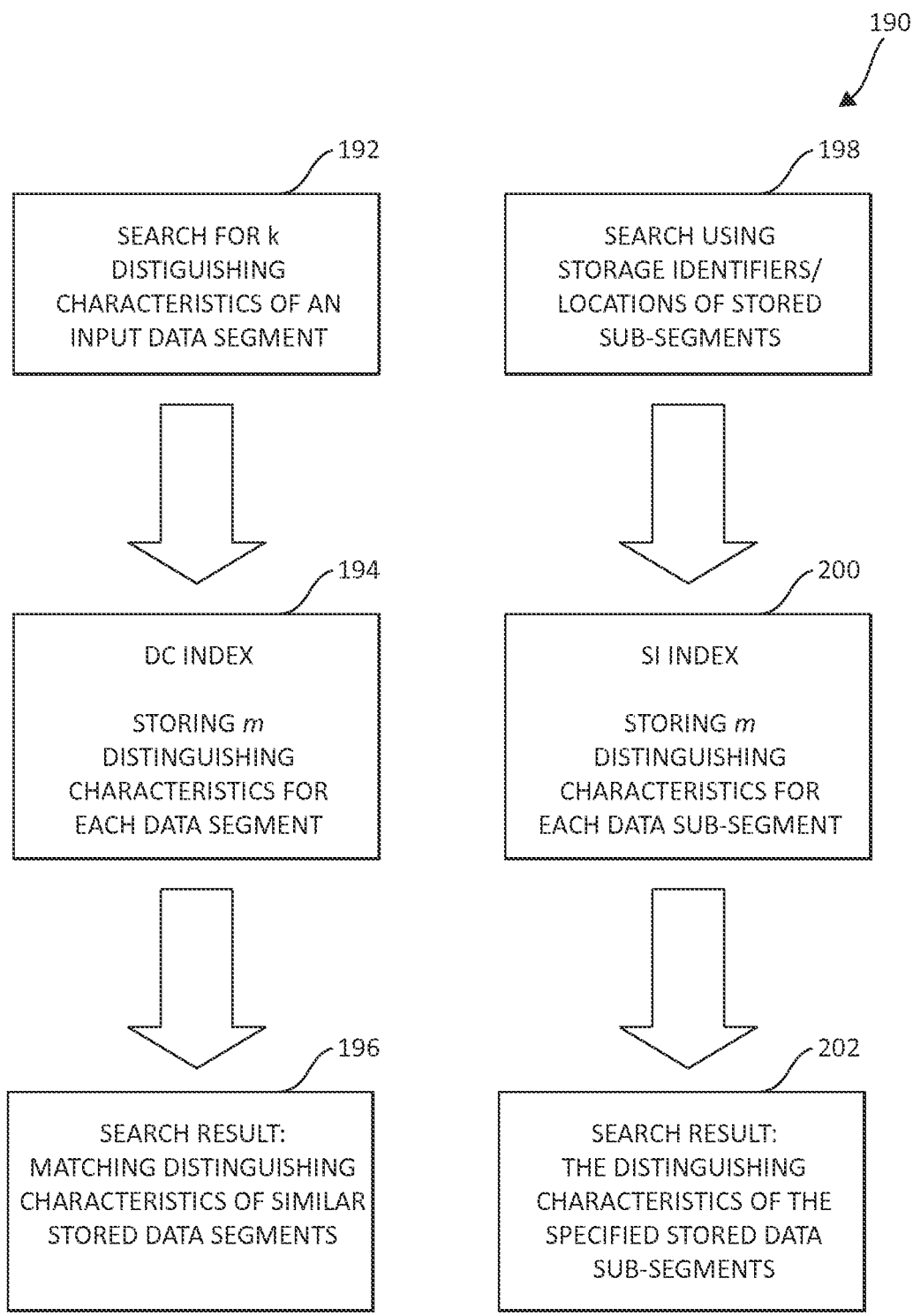
FIG. 8 illustrates exemplary distinguishing characteristics (DC) and storage identifiers (SI) indexes.

FIG. 8 illustrates exemplary distinguishing characteristics (DC) and storage identifiers (SI) indexes, and an exemplary methodology 190 for using the indexes. In block 192, a search is made for k distinguishing characteristics of an input data segment. These are provided to the DC index, in block 194, which stores m distinguishing characteristics for each data segment. The search result is shown in block 196, containing matching distinguishing characteristics of similar stored data segments. In block 198, a search is made using storage identifiers/locations of stored sub-segments. These are provided to the SI index, in block 200, which stores m distinguishing characteristics for each data sub-segment. The search result is shown in block 202, containing the distinguishing characteristics of the specified stored data sub-segments.

The DC index is used in the similarity search process of an input data segment, to find its similar data segments in the storage. The SI index is used for several purposes, including (1) optimized calculation of the distinguishing characteristics of a synthetic backup, as will be detailed in the following; (2), when a set of data segments is deleted from the storage, the distinguishing characteristics of these data segments are retrieved from the SI index and then deleted from both the DC index (using the information from the SI index) and from the SI index; and (3) when the distinguishing characteristics of a data segment should be removed from the DC index (e.g. for their replacement with distinguishing characteristics of a newer data segment), its distinguishing characteristics are retrieved from the SI index and then removed from the DC index.

Figure 10A:
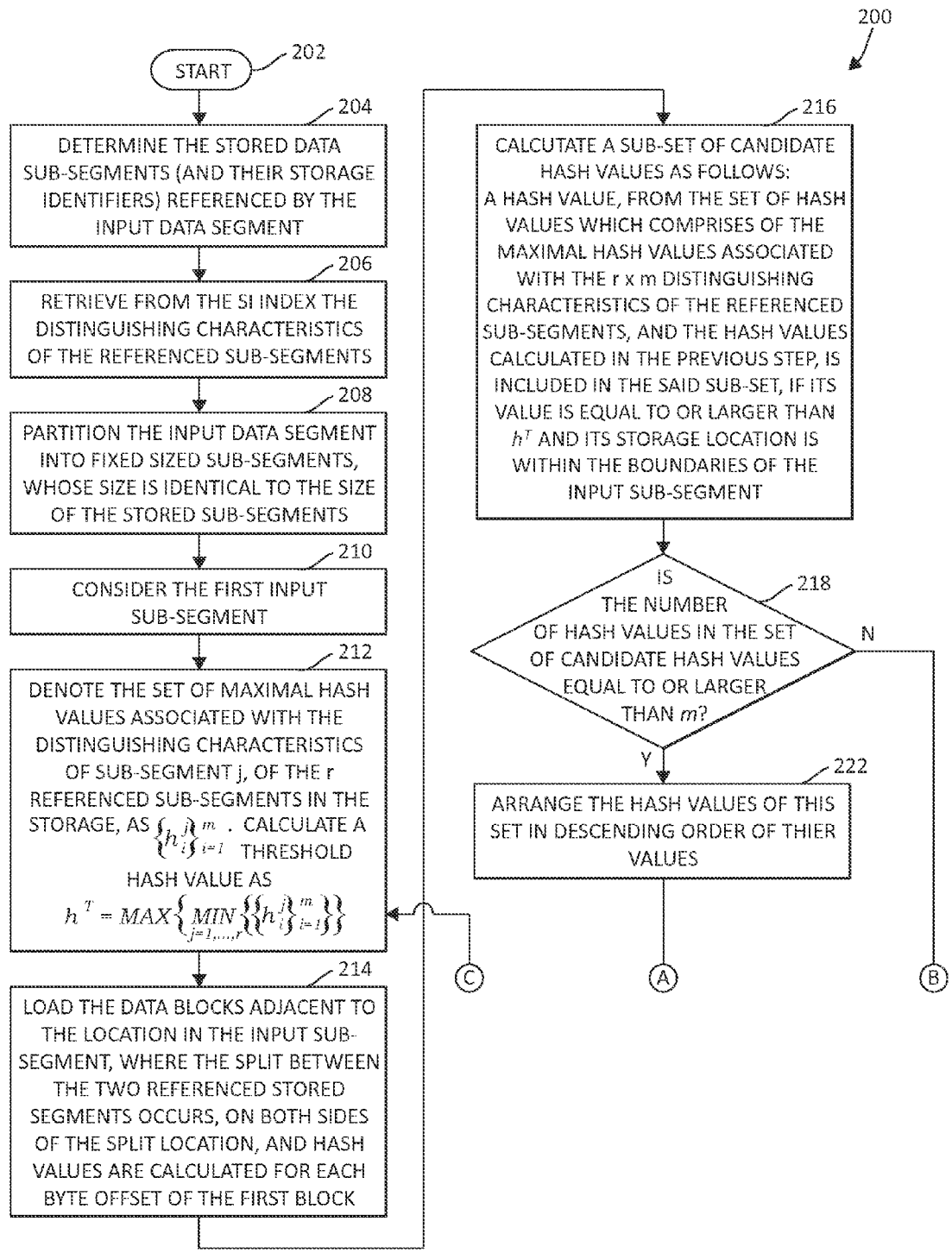
FIGS. 10A and 10B collectively illustrate an exemplary method for calculating the distinguishing characteristics of a data segment in a synthetic backup.
Figure 10B:
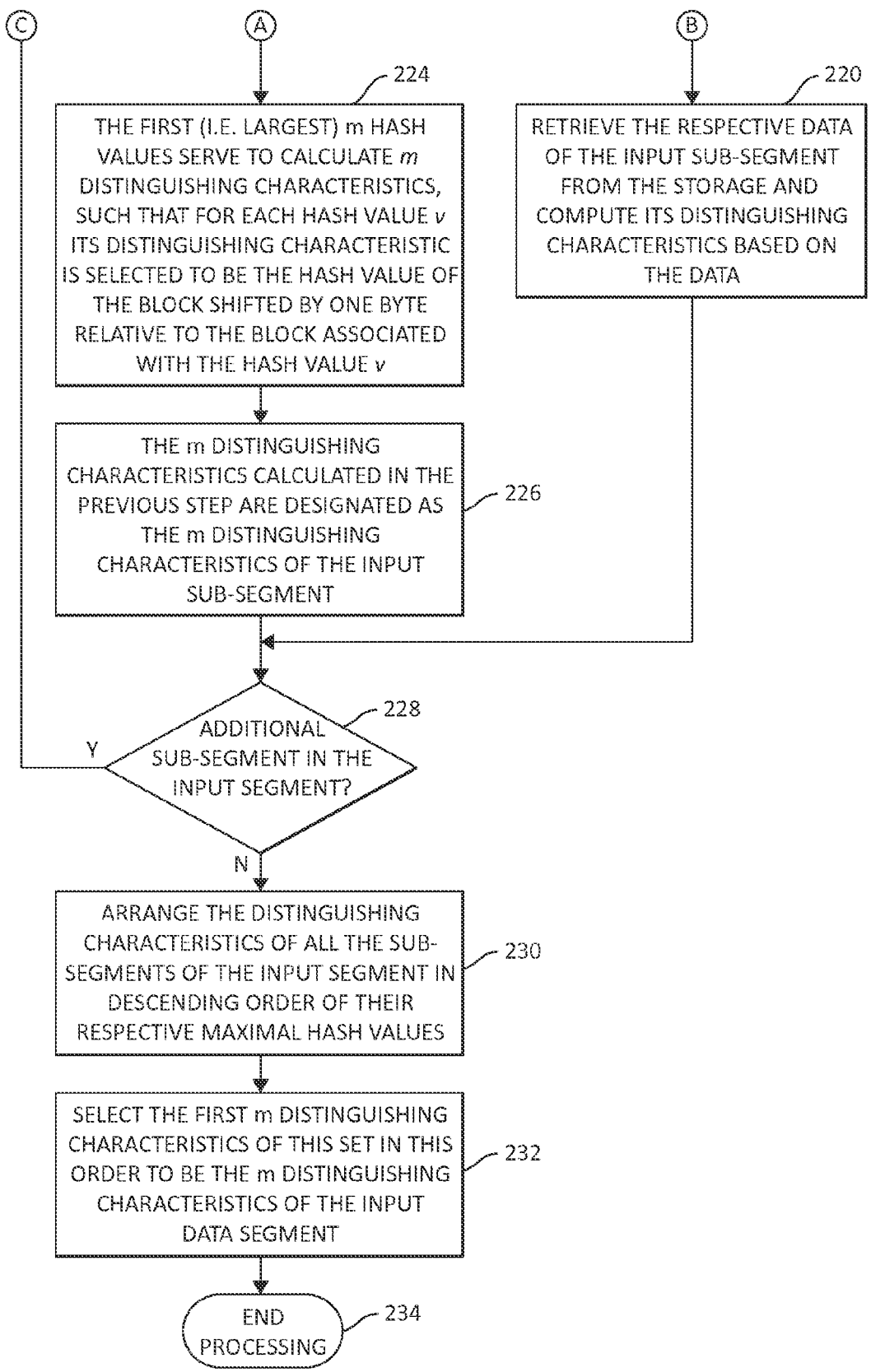

Turning now to FIGS. 10A and 10B, a collectively illustration of an exemplary method 200 for calculating the distinguishing characteristics of a data segment in a synthetic backup, based on existing distinguishing characteristics, is shown. Method 200 begins (step 202) by determining the stored data sub-segments referenced by the input data segment (step 204). This is done based on the metadata instructions provided by the backup application, by which the data segment in the synthetic backup is constructed. These metadata instructions specify the stored data that is to be used to construct the given segment. From this information the storage system deduces the stored sub-segments (and their storage identifiers) referenced by the input data segment.

The distinguishing characteristics of the referenced sub-segments (m distinguishing characteristics for each sub-segment) are retrieved from the SI index (step 206). The input data segment from the synthetic backup is partitioned into fixed sized sub-segments, whose size is identical to the size of the stored sub-segments (step 208). The first input sub-segment is considered (step 210). For each sub-segment of the input sub-segments the following is performed. The input sub-segment references at least one and up to f stored sub-segments. Assuming that the size of a sub-segment is smaller than the minimal size of a data segment in the storage that is referenced by a synthetic backup, then depending on the alignment of the input sub-segment with the stored sub-segments, the input sub-segment may reference between one and four stored sub-segments. This is illustrated previously in FIG. 9. In this figure, the input sub-segments are shown above their referenced stored sub-segments, and the solid vertical lines indicate alignment boundaries of sub-segments. Parts (a) and (b) of this figure show an input sub-segment that references a continuous stored segment, and parts (c)-(e) show an input sub-segment that references two separate stored segments. If it is assumed that the size of a sub-segment may be larger than the minimal size of a data segment in the storage which is referenced by a synthetic backup, then an input sub-segment may reference up to f stored sub-segments, where f equals the size of an input sub-segment divided by the minimal size of a stored data segment which is referenced by a synthetic backup and multiplied by two (since each reference may be associated with two stored sub-segments).

Figure 9:
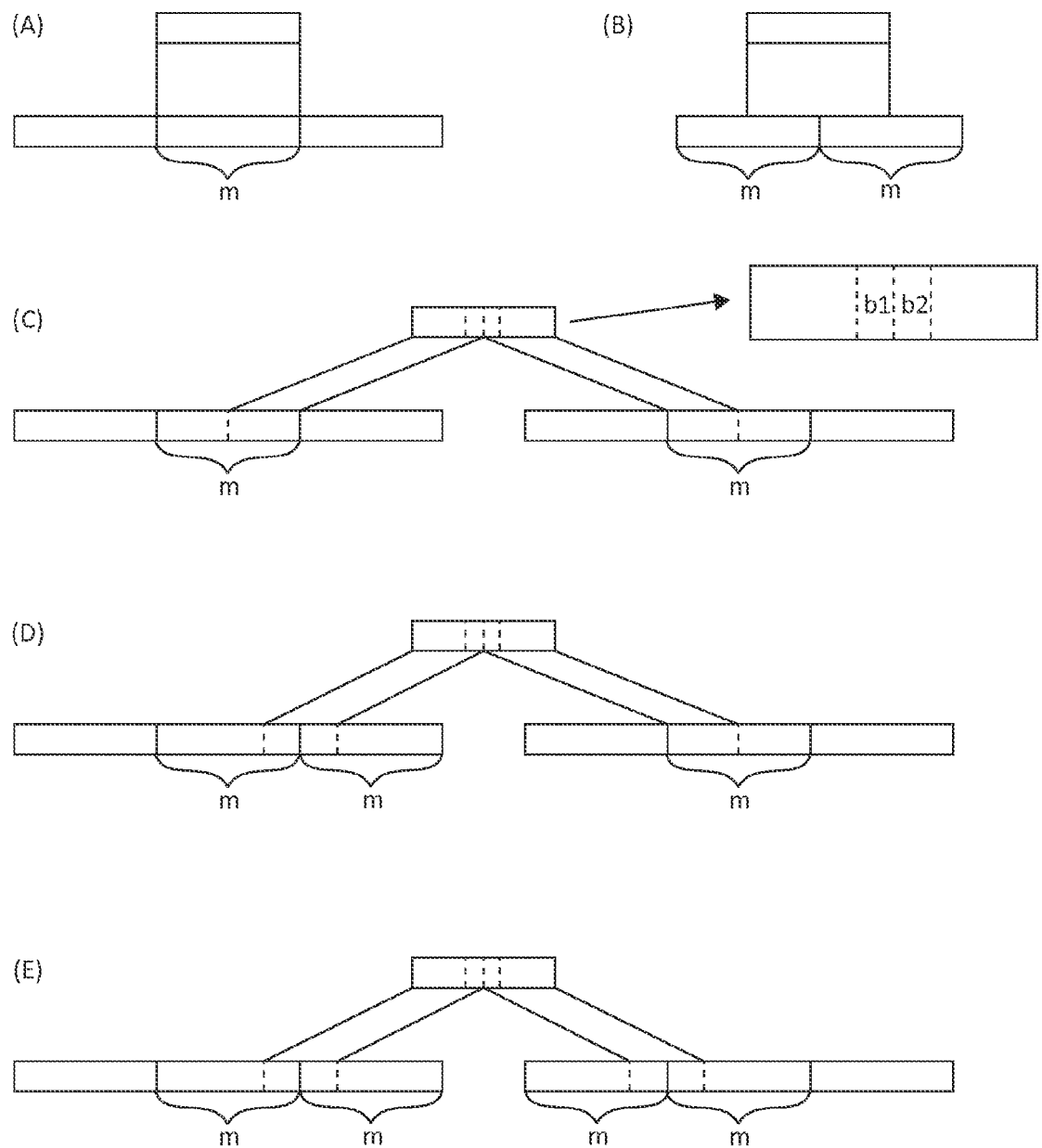
FIG. 9 illustrates exemplary mapping of an input sub-segment with stored sub-segments.

Returning to FIG. 10A, the number of storage sub-segments referenced by the input sub-segment is denoted as r. Each of the referenced sub-segments is associated with m distinguishing characteristics retrieved from the SI index (as shown in FIG. 9), and these r×m distinguishing characteristics are considered as follows. The maximal hash values associated with each of the said distinguishing characteristics are considered. Note that in the record of each distinguishing characteristic retrieved from the SI index, included also is its associated maximal hash value. The set of maximal hash values associated with the distinguishing characteristics of sub-segment j, of the r referenced sub-segments in the storage, is denoted as $\{h_i^j\}_{i=1}^m$. A threshold hash value is calculated as $$h^T = \mathrm{MAX}\left\{\mathop{\mathrm{MIN}}_{j=1,\ldots,r} \{\{h_i^j\}_{i=1}^m\}\right\}. \quad \text{(step 212)}$$

If the input sub-segment references more than a single stored segment (as exemplified in parts (c)-(e) of FIG. 9), and if distinguishing characteristics of a sub-segment are calculated also based on the bytes of its last block, then the data blocks adjacent to the location in the input sub-segment, where the split between the two referenced stored segments occurs, on both sides of the split location, indicated as blocks b1 and b2 in FIG. 9, are loaded, and hash values are calculated for each byte offset of block b1, using the method specified previously (step 214). A sub-set of candidate hash values is calculated from the set of hash values which comprises of the maximal hash values associated with the r×m distinguishing characteristics of the referenced sub-segments, and the hash values calculated in the previous step, using the following method. A hash value is included in the said sub-set of hash values, if its value is equal to or larger than $h^T$ and its storage location is within the boundaries of the input sub-segment (step 216).

If the number of hash values in the set of candidate hash values is equal to or larger than m (step 218) then the following is performed. The hash values of this set are arranged in descending order of their values (step 222). The first (i.e. largest) m hash values serve to calculate m distinguishing characteristics, such that for each hash value v its distinguishing characteristic is selected to be the hash value of the block shifted by one byte relative to the block associated with the hash value v (step 224). If the hash value v being considered is associated with a distinguishing characteristic from the set of r×m distinguishing characteristics of the referenced sub-segments, then its value of distinguishing characteristic is readily available from the respective record retrieved from the SI index. If the hash value v being considered is of the hash values calculated in step 214, then its distinguishing characteristic is readily available from the set of hash values computed in step 214. The m distinguishing characteristics calculated in the previous step are designated as the m distinguishing characteristics of the input sub-segment (step 226). The designated distinguishing characteristics are later stored (associated with their respective input sub-segment) in the SI index; and also serve as basis for computing the m distinguishing characteristics of the entire input data segment (as detailed in the following), to be later stored in the DC index. Step 228 queries if additional sub-segments exist in the input segment, and if so, the method 200 returns to step 212 for further processing.

Returning to step 218, if the number of hash values in the set of candidate hash values is lower than m then the following is performed. The respective data of the input sub-segment is retrieved from the storage and its distinguishing characteristics are computed based on the data (step 220). In this case the m distinguishing characteristics of the sub-segment cannot be calculated based on the existing distinguishing characteristics. However, based on the expected uniform distribution of the distinguishing characteristics in terms of their storage locations, the frequency of this case should be low relative to the case where the m distinguishing characteristics of the input sub-segment can be calculated based on the existing distinguishing characteristics. Again, method 200 returns to step 228, and to step 212 for further processing, if applicable.

If in step 228, no additional sub-segments exist, the m distinguishing characteristics of the input data segment are calculated using the following method. Assuming that there are s sub-segments in the input segment, then the set of s×m distinguishing characteristics calculated for all the sub-segments of the input segment is considered. The distinguishing characteristics of this set are arranged in descending order of their respective maximal hash values (step 230). The first m distinguishing characteristics of this set in this order (namely, the m distinguishing characteristics with the largest respective maximal hash values), are selected to be the m distinguishing characteristics of the input data segment (step 232). These distinguishing characteristics are later stored (associated with their respective input data segment) in the DC index. The method 200 then ends (step 234).

The method 200 specified above for efficient calculation of the digests of the data of a synthetic backup, based on existing and stored digests of the data segments referenced by the synthetic backup, minimizes access to the data itself during the calculation process, thus significantly accelerating both the digests calculation process and the overall construction time of a synthetic backup.

Figure 11:
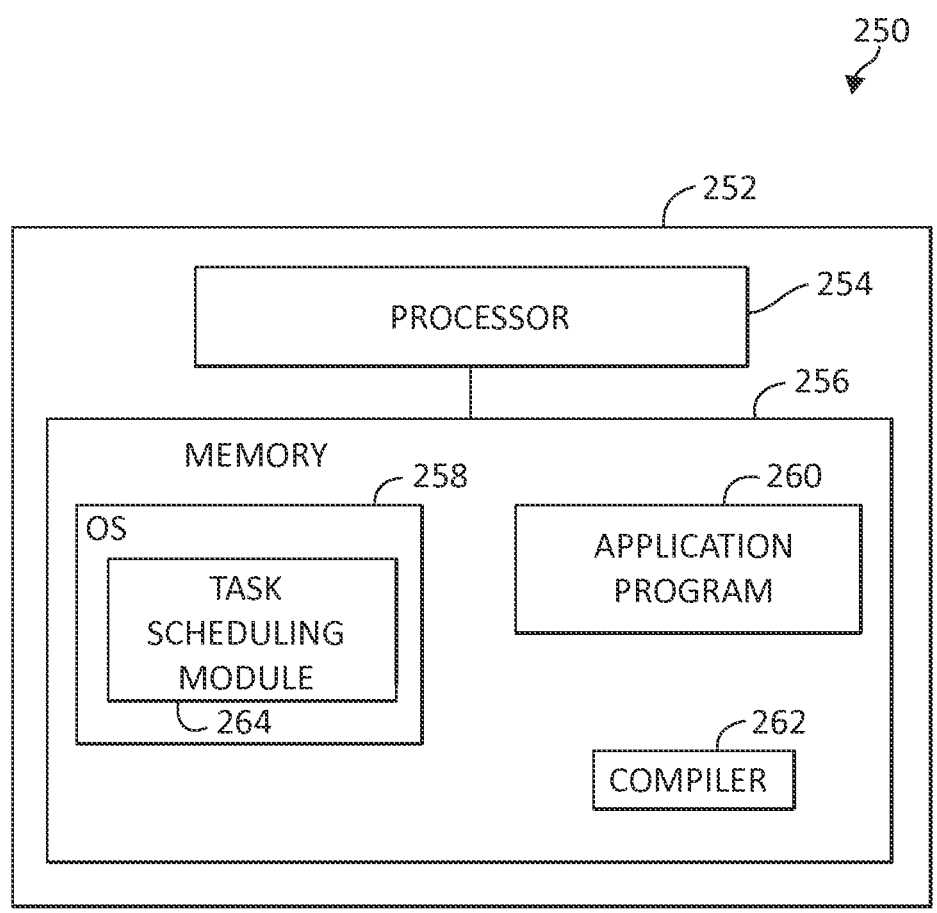
FIG. 11 illustrates an exemplary portion of a deduplication system, including a processor device, in which aspects of the illustrated embodiments may be implemented.

FIG. 11 illustrates an exemplary portion 252 of a deduplication system 250, previously, including a processor device, in which aspects of the illustrated embodiments may be implemented. Portion 252 of deduplication system 250 is operable in a computer environment as a portion thereof, in which mechanisms of the following illustrated embodiments may be implemented. It should be appreciated, however, that FIG. 11 is only exemplary and is not intended to state or imply any limitation as to the particular architectures in which the exemplary aspects of the various embodiments may be implemented. Many modifications to the architecture depicted in FIG. 11 may be made without departing from the scope and spirit of the following description and claimed subject matter.

Portion 252 includes a processor 254 and a memory 256, such as random access memory (RAM). The deduplication system 250 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the deduplication system 250.

In the illustrated embodiment, the deduplication system 250 and/or portion 252 operates under control of an operating system (OS) 258 (e.g. z/OS, OS/2, LINUX, UNIX, WINDOWS, MAC OS) stored in the memory 256, and interfaces with the user to accept inputs and commands and to present results. In one embodiment of the present invention, the OS 258 facilitates synthetic backup functionality according to the present invention. To this end, OS 258 includes a task scheduling module 264 which may be adapted for carrying out various processes and mechanisms in the exemplary methods described following.

The deduplication system 250 and/or portion 252 may implement a compiler 262 that allows an application program 260 written in a programming language such as COBOL, PL/1, C, C++, JAVA, ADA, BASIC, VISUAL BASIC or any other programming language to be translated into code that is readable by the processor 254. After completion, the application program 260 accesses and manipulates data stored in the memory 256 of the deduplication system 250 and/or portion 252 using the relationships and logic that was generated using the compiler 262.

To further implement and execute mechanisms and processes according to the present invention, OS 258, in conjunction with memory 256, processor 254, application program 260, and other computer processing, networking, and storage components, may implement additional modules to perform and facilitate synthetic backup functionality, which are not illustrated for purposes of convenience. As one of ordinary skill in the art will appreciate, the mechanisms of these additional modules as presently illustrated may be implemented in various forms and architectures. Accordingly, the illustration of task scheduling module 264 in the present figure is again intended to demonstrate logical relationships between possible computing components in the deduplication system 250 and/or portion 252, and not to imply a specific physical structure or relationship.

In one embodiment, instructions implementing the operating system 258, the application program 260, and the compiler 262, as well as the task scheduling module 264 and additional modules, are tangibly embodied in a computer-readable medium, which may include one or more fixed or removable data storage devices, such as a zip drive, disk, hard drive, DVD/CD-ROM, digital tape, SSDs, etc. Further, the operating system 258 and the application program 260 comprise instructions which, when read and executed by the deduplication system 250 and/or portion 252, cause the deduplication system 250 and/or portion 252 to perform the steps necessary to implement and/or use the present invention. Application program 260 and/or operating system 258 instructions may also be tangibly embodied in the memory 256 and/or transmitted through or accessed by network functionality via various components. As such, the terms "article of manufacture," "program storage device" and "computer program product" as may be used herein are intended to encompass a computer program accessible and/or operable from any computer readable device or media.

Embodiments of the present invention may include one or more associated software application programs 260 that include, for example, functions for managing a distributed computer system comprising a network of computing devices, such as a storage area network (SAN). Accordingly, processor 254 may comprise one or more storage management processors (SMP) or other specialized devices. The application program 260 may operate within a single computer and/or deduplication system 250 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system, for a plurality of new input data segments in a deduplication storage system, for facilitating construction of a synthetic backup, the synthetic backup being independent of and constructed from an originating backup being a full, existing backup, the system comprising:
    a memory; and
    at least one processor device in communication with the memory, operable in the deduplication computing storage environment, wherein the at least one processor device is adapted for:
        for each new input data segment of the plurality of new input data segments, retrieving a plurality of stored deduplication digests of stored data segments, referenced by the new input data segments, the stored data segments being data taken from the originating backup, and the plurality of stored deduplication digests being deduplication digests calculated from the stored data segments,
        partitioning each new input data segment into each of a plurality of fixed-sized data sub-segments,
        for each of the plurality of data sub-segments, during the construction of the synthetic backup, calculating each of a plurality of input deduplication digests based on the retrieved plurality of stored deduplication digests,
        aggregating each of the plurality of sub-segment deduplication digests to generate a deduplication digest of each new input data segment,
        searching the plurality of stored deduplication digests of the stored data segments for matches with the deduplication digest of each new input data segment to thereby deduplicate each new input data segment, and
        forming a deduplication digest of the synthetic backup from the deduplication digests of each new input data segment.

2. The system of claim 1, wherein the at least one processor device is further adapted for, subsequent to the searching, storing the plurality of input deduplication digests in the index, wherein a stored deduplication digest of the plurality of stored deduplication digests matched with an input deduplication digest of the plurality of input deduplication digests may be displaced by the input deduplication digest.

3. The system of claim 1, wherein the at least one processor device is further adapted for, pursuant to constructing the synthetic backup:
    creating a metadata file in the deduplicated storage system, and
    optimizing successive storage instructions.

4. The system of claim 3, wherein the at least one processor device is further adapted for, for each optimized storage instruction:
    retrieving a metadata segment associated with the new input data segment indicated by the optimized storage instruction,
    adjusting the metadata segment to reference solely the new input data segment,
    copying the adjusted metadata segment to the metadata file of the synthetic backup, and
    for each storage block referenced by the metadata segment, incrementing a reference count value.

5. The system of claim 1, wherein the at least one processor device is further adapted for, pursuant to calculating each of a plurality of sub-segment deduplication digests:
    calculating a hash value for each block in the plurality of new input data segments in byte offsets,
    arranging a selected plurality of maximal hash values in descending order according to an order of significance,
    identifying blocks in determined positions relative to the blocks associated with the maximal hash values as shifted blocks,
    selecting a subset of the hash values of the shifted blocks for a first distinguishing characteristic of the plurality of input data sub-segments, and
    selecting an additional subset of the hash values of the shifted blocks, for a second distinguishing characteristic of the plurality of new input data segments.

6. The system of claim 5, wherein the at least one processor device is further adapted for configuring a distinguishing characteristics (DC) index for the plurality of new input data segments for storing the second distinguishing characteristic, and configuring a storage identifiers (SI) index for the plurality of input data sub-segments for storing the first distinguishing characteristic.

7. The system of claim 6, wherein the at least one processor device is further adapted for calculating the first and second distinguishing characteristics.

8. A computer program product, for a plurality of new input data segments in a deduplication storage system, for facilitating construction of a synthetic backup by at least one processor device, the synthetic backup being independent of and constructed from an originating backup being a full, existing backup, the computer program product comprising a non-transitory computer-readable storage medium having computer-readable program code portions stored therein, the computer-readable program code portions comprising:
    a first executable portion for, for each new input data segment of the plurality of new input data segments, retrieving a plurality of stored deduplication digests of stored data segments, referenced by the new input data segments, the stored data segments being data taken from the originating backup, and the plurality of stored deduplication digests being deduplication digests calculated from the stored data segments;

a second executable portion for partitioning each new input data segment into each of a plurality of fixed-sized data sub-segments;

a third executable portion for, for each of the plurality of data sub-segments, during the construction of the synthetic backup, calculating each of a plurality of input deduplication digests based on the retrieved plurality of stored deduplication digests;

a fourth executable portion for aggregating each of the plurality of sub-segment deduplication digests to generate a deduplication digest of each new input data segment;

a fifth executable portion for searching the plurality of stored deduplication digests of the stored data segments for matches with the deduplication digest of each new input data segment to thereby deduplicate each new input data segment; and a sixth executable portion for forming a deduplication digest of the synthetic backup from the deduplication digests of each new input data segment.

9. The computer program product of claim 8, further including a seventh executable portion for, subsequent to the searching, storing the plurality of input deduplication digests in the index, wherein a stored deduplication digest of the plurality of stored deduplication digests matched with an input deduplication digest of the plurality of input deduplication digests may be displaced by the input deduplication digest.

10. The computer program product of claim 8, further including a seventh executable portion for, pursuant to constructing the synthetic backup:

creating a metadata file in the deduplicated storage system, and optimizing successive storage instructions.

11. The computer program product of claim 10, further including an eighth executable portion for, for each optimized storage instruction:

retrieving a metadata segment associated with the new input data segment indicated by the optimized storage instruction, adjusting the metadata segment to reference solely the new input data segment, copying the adjusted metadata segment to the metadata file of the synthetic backup, and for each storage block referenced by the metadata segment, incrementing a reference count value.

12. The computer program product of claim 8, further including a seventh executable portion for, pursuant to calculating each of a plurality of sub-segment deduplication digests:

calculating a hash value for each block in the plurality of new input data segments in byte offsets, arranging a selected plurality of maximal hash values in descending order according to an order of significance, identifying blocks in determined positions relative to the blocks associated with the maximal hash values as shifted blocks, selecting a subset of the hash values of the shifted blocks for a first distinguishing characteristic of the plurality of input data sub-segments, and selecting an additional subset of the hash values of the shifted blocks, for a second distinguishing characteristic of the plurality of new input data segments.

13. The computer program product of claim 12, further including an eighth executable portion for configuring a distinguishing characteristics (DC) index for the plurality of new input data segments for storing the second distinguishing characteristic, and configuring a storage identifiers (SI) index for the plurality of input data sub-segments for storing the first distinguishing characteristic.

14. The computer program product of claim 13, further including a ninth executable portion for calculating the first and second distinguishing characteristics.

* * * * *